(12) United States Patent
Winters (10) Patent No.: US 8,477,807 B1
(45) Date of Patent: Jul. 2, 2013

(54) UPSTREAM RANGING IN COMMUNICATIONS DEVICES

(75) Inventor: Derek Winters, Atlanta, GA (US)

(73) Assignee: ARRIS Group, Inc., Suwanee, GA (US)

(*) Notice: Subject to any disclaimer, the term of this patent is extended or adjusted under 35 U.S.C. 154(b) by 224 days.

(21) Appl. No.: 12/830,535

(22) Filed: Jul. 6, 2010

Related U.S. Application Data (60) Provisional application No. 61/223,141, filed on Jul. 6, 2009.

(51) Int. Cl.
*H04J 1/00* (2006.01)

(52) U.S. Cl.
USPC .................................................. 370/485

(58) Field of Classification Search
USPC ............ 370/431, 432, 436, 442, 461–465, 370/478, 485, 493–496, 498, 503, 510; 375/222, 375/354–356; 725/105, 111, 112, 114
See application file for complete search history.

(56) References Cited

U.S. PATENT DOCUMENTS

2009/0125959 A1* 5/2009 Oh et al. .......................... 725/111

OTHER PUBLICATIONS

CM-SP-MULPIv3.0-I06-071206, Data-Over-Cable Service Interface Specifications DOCSIS 3.0, MAC and Upper Layer Protocols Interface Specification, 757 pages, Dec. 6, 2007 (hereinafter "Doc").*

* cited by examiner

*Primary Examiner* — Frank Duong
(74) *Attorney, Agent, or Firm* — Troy A. Van Aacken; Robert J. Starr (57) ABSTRACT

Systems, methods, and apparatuses can provide improved ranging for communications devices. This improved ranging can include prioritizing an upstream ambiguity list and/or prioritizing visible upstream channel identifiers, and generating a hierarchical candidate list for use in initial ranging for a communications device.

25 Claims, 5 Drawing Sheets

FIG. 5 ial utility
UPSTREAM RANGING IN COMMUNICATIONS DEVICES

RELATED APPLICATIONS

This application claims priority as a non-provisional utility of U.S. Provisional Patent Application Ser. No. 61/223,141, entitled "Improving Upstream Ranging in Communications Devices", filed Jul. 6, 2010, which is incorporated herein by reference in its entirety.

TECHNICAL FIELD

This disclosure is related to a ranging functionality provided in some communications devices.

BACKGROUND

The Data-Over-Cable Service Interface Specification (DOCSIS) was established by cable television network operators to facilitate transporting data traffic, primarily Internet traffic, over existing community antenna television (CATV) networks. In addition to transporting data traffic, as well as television content signals over a CATV network, multiple services operators (MSO) also use their CATV network infrastructure for carrying voice, video on demand (VoD) and video conferencing traffic signals, among other types of traffic.

Based in part upon increasingly complex topologies of cable and fiber networks in deployed DOCSIS-compliant systems, the DOCSIS 3.0 specification has enhanced the capabilities of the headend with regard to locating specific devices in its network. The DOCSIS 3.0 media access control (MAC) and upper layer protocols interface (MULPI) spec introduces the concepts of MAC domain upstream service groups (or MD-US-SGs). An MD-US-SG refers to the set of upstream channels from the same MAC Domain that is reached by a single cable modem. In order to help the headend cable modem termination system (CMTS) isolate each individual modem to a particular MD-US-SG and resolve upstream ambiguity, the spec has made multiple changes to the way cable modems perform ranging and registration on DOCSIS 3.0 networks.

Upstream (US) ranging was modified in DOCSIS 3.0 to no longer depend on collection of upstream channel descriptors (UCDs) for determination of potential upstream channels to range on. The cable modem now builds a candidate upstream channel identification (UCID) hierarchical candidate list by randomly ordering the UCIDs contained in an upstream ambiguity resolution channel list contained in the MAC domain descriptor (MDD) message from the CMTS. If any of these UCIDs are stored in non-volatile memory as the last operational transmit channel set, then the cable modem can move such UCIDs to the front of the hierarchical candidate list. In addition if any UCIDs were sent in a ranging-response (RNG-RSP) message, a config file, or a dynamic channel change-request (DCC-REQ) then these UCIDs are added to the head of the hierarchical candidate list. (See MULPI 10.2.3.5 for details) The modem can then proceed to look for UCDs for any UCIDs in the hierarchical candidate list. Starting at the head of the hierarchical candidate list it will attempt to perform initial ranging. If this process fails the cable modem can repeat using the next UCID from its list. Once it succeeds the cable modem can continue upstream ambiguity resolution initial ranging as directed by the CMTS. Further details on the specified upstream ranging procedure can be found in the DOCSIS 2.0 and 3.0 specifications and the MULPI specification, each of which are hereby incorporated by reference.

Though much consideration was put into upstream ranging in DOCSIS 3.0, testing has identified that the changes with regard to the upstream channel candidate list can be limiting and can even cause outages in some situations.

SUMMARY

Systems and methods of this disclosure can operate to improve upstream ranging and can include prioritizing an upstream ambiguity list and generating a hierarchical candidate list for use in initial ranging for a communications device. Example methods can include the steps of: identifying a downstream channel; receiving a list of upstream channels on said downstream channel; randomizing said list of upstream channels; sorting the randomized list of upstream channels; creating a hierarchical candidate list based on said sorted list of upstream channels and one or more predefined channels; and performing ranging on upstream channels in an order defined by the hierarchical candidate list until successfully ranging on one of the upstream channels.

Example systems can include an input/output device, a data store and a processor. The input/output device can be operable to identify a downstream channel to receive a list of upstream channels on said downstream channel; and perform ranging on the upstream channels as instructed by the processor where the ranging is performed in an order defined by the hierarchical candidate list until successfully ranging on one of the upstream channels. The data store can be operable to store computer program instructions and temporary storage for said processor. The processor can be operable to execute computer program instructions, the computer program instructions being operable to cause the processor to: randomize said list of upstream channels; sort the randomized list of upstream channels; and generate a hierarchical candidate list by appending said sorted list of upstream channels after one or more predefined channels.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE FIGURES

Like reference numbers and designations in the various drawings indicate like elements.

DETAILED DESCRIPTION

The CMTS is responsible for generation of the US Ambiguity Resolution Channel List. The CMTS uses its knowledge of the fiber node configuration of its network to generate a hierarchical candidate list that will help it resolve ambiguity and narrow a cable modem down to a particular MD-US-SG as quickly as possible. Often this list may have as little as one entry on it, even if there are other potential upstreams to range on. Due to the specification requirements for the cable modem, the modem might only ever try to range on this one upstream on the list, bypassing other available upstreams that are in existence on the network. If the one upstream on the candidate list is interfered with (i.e., cable cut, attenuation, noise interference, etc) then a cable modem may not be able to range and register if it adheres strictly to the specification.

Another situation that this new design addresses, relates to having multiple UCIDs on the ambiguity list. By randomizing the ambiguity list according to the DOCSIS 3.0 standard (as opposed to sorting the list by channel type as was the case in DOCSIS 2.0) the modem may try to use a smaller upstream channel when a larger upstream channel is available. The idea of randomization provides a quick method of load balancing a large amount of modems across multiple upstreams during the ranging process. Thus, it can give a modem a chance of coming in on the correct upstream during the first ranging attempt when there are two possible upstream channels and one upstream channel is not accessible. However, in a real-world implementation, most MSOs would prefer to not have smaller channels inundated with a large amount of modems when there are larger channels they could range on. An MSO may prefer to have the CMTS perform load balancing to move the cable modems over to these smaller channels as it sees fit. So in this case randomization can actually hurt the real-world desires of customers.

In some implementations, this disclosure alters the generation of the UCID hierarchical candidate list for ranging. The UCID hierarchical candidate list can continue to provide preferential treatment for last operational channels stored in non-volatile memory as well as any UCIDs sent down via RNG-REQ messages, config files, or DCC-REQ messages. The modem will now randomize the upstream ambiguity list and then sort the randomized list by channel type. This will give preference to higher type channels while keeping any randomized ordering intact. The modem can also collect all UCDs that are visible on the current downstream and append any UCIDs that it finds that are not on its current list to the end of the hierarchical candidate list. The modem can also sort the collected UCIDs by channel type. The end result of the generation of a hierarchical candidate list is that these UCIDs can enable cable modems to successfully range under fault conditions and improve system performance. Thus, all possible UCIDs can be attempted in addition to the UCIDs on the ambiguity list may not be successful. This provides the modem a chance to range on all possible upstream channels while maintaining the newly introduced features of the DOCSIS 3.0 specification.

In other implementations, these same systems, methods and apparatus can provide improved ranging for non DOCSIS 3.0 based communication systems including wireless, wired and optical communications systems. This improved ranging can include prioritizing an upstream ambiguity list and prioritizing visible upstream channel identifiers, and generating a hierarchical candidate list for use in initial ranging for a communications.

Figure 1:
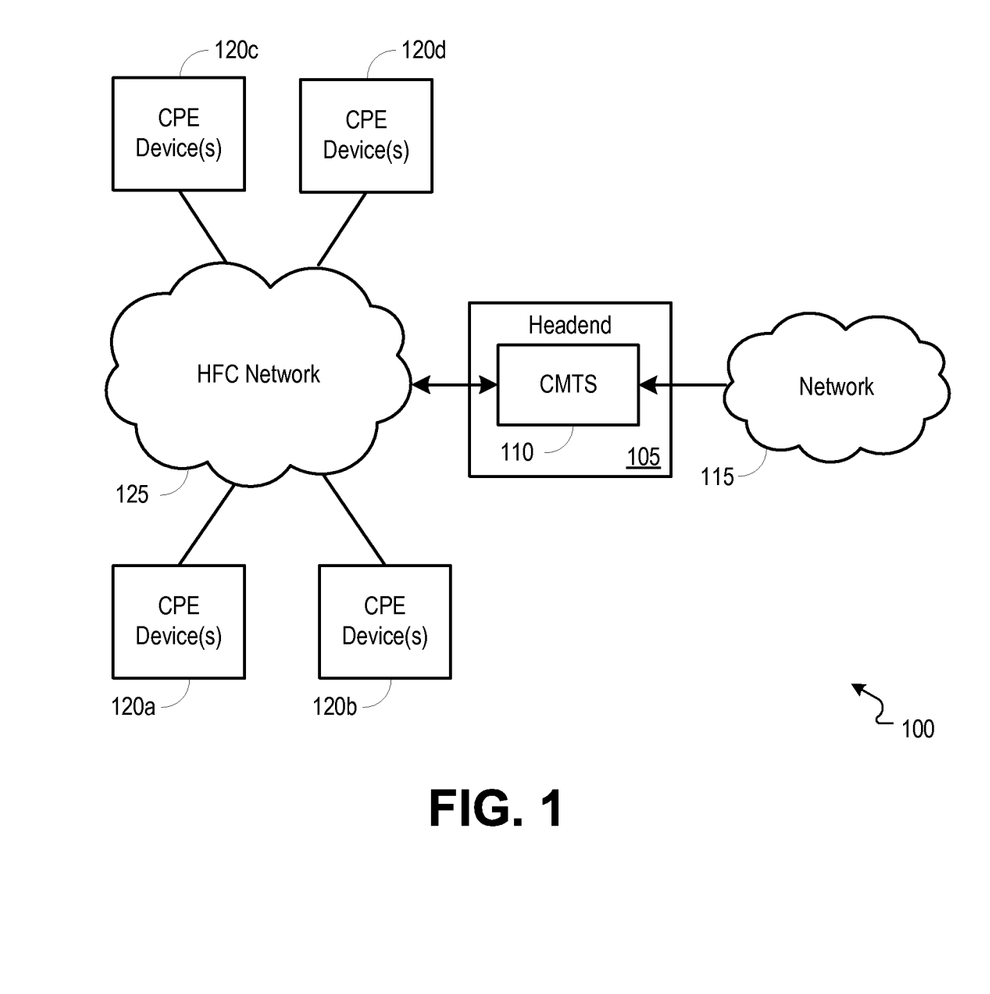
FIG. 1 is a block diagram illustrating an exemplary network environment operable to provide improved upstream ranging on communications devices.

FIG. 1 is a block diagram illustrating an exemplary network environment 100 operable to provide improved upstream ranging on communications devices. In some implementations, a headend 105 can provide video, data and voice service to a subscriber. The headend 105 can include communications devices such as an edge quadrature amplitude modulation (EQAM) device and a cable modem termination system (CMTS) 110. Information, e.g., including voice, data and video streams, among others, can be received from a video source (or sources) through a network 115.

Data services can be handled by the headend 105 through a CMTS 115. The CMTS 115 can receive data signals from user device(s) 120 a hybrid fiber-coax (HFC) network 125. The HFC network can communicate data packets between the headend 105 and customer premise devices (CPE) 120*a-d*. The CMTS can forward received packets to a modulator used to modulate the signal onto a carrier waveform. The carrier waveform can include both data and video streams, in both multicast (e.g., point-to-multipoint) and unicast (e.g., point-to-point) formats for transmission to one or more CPE device 125*a-d* (e.g., cable modems, set top boxes, media terminal adapters, etc.) via the hybrid fiber-coax (HFC) network 125. In some examples, the CMTS can be paired with a SIP proxy server operable to provide voice over internet protocol (VoIP) services with connectivity to the public switched telephone network (PSTN).

When a CPE device 125*a-d* initially connects to the HFC network 125, the CPE device 125*a-d* typically follows a procedure to connect to the network. Some such procedures have been standardized by standards such as DOCSIS 2.0 and DOCSIS 3.0, to provide a standard mechanism by which the CPE device 125*a-d* can connect to the HFC network 125. However, as has been noted above, the procedure identified by DOCSIS 3.0 can lead to undesirable results. This disclosure outlines an improvement to the ranging procedure defined by the DOCSIS 3.0 standard to overcome such undesirable results.

The first step in the ranging procedure generally involves the CPE device 125*a-d* identifying and locking onto a downstream channel frequency. This can be done by scanning the frequency range defined by the DOCSIS 3.0 standard to identify a downstream channel upon which the CMTS 110 is communicating with the CPE devices 125*a-d*. Once the downstream channel frequency is identified, the downstream channel frequency can be stored to a memory (e.g., both nonvolatile and volatile memory in some implementations) for future use. The CPE device 125*a-d* can then begin to receive downstream messages from the CMTS 110.

The second step, as defined by the DOCSIS 3.0 standard includes receiving MAC domain descriptor (MDD) messages. The MAC domain descriptor messages typically include an upstream ambiguity list. The upstream ambiguity list provides a list of upstream channels that are provided preference over other channels by the CMTS. The upstream channels included on the upstream channel ambiguity list are selected because they provide differentiation between nodes on a network. Based upon the node selected by a CPE device 125*a-d*, the CMTS can identify the node to which the new CPE device 125*a-d* belongs. Channels on the upstream ambiguity list or those in a config file, RNG-RSP, DCC-REQ UCIDs not in the ambiguity list will therefore be tried before other channels identified in UCD messages.

The CPE device 125*a-d* can randomize the received upstream ambiguity list. The upstream ambiguity list can be randomized in order to provide a more even distribution for devices 125*a-d* successfully performing the initial ranging, instead of all devices choosing the same upstream channel and failing the initial ranging or all devices choosing the same upstream channel. Such randomization can also serve to balance the load for the CMTS 110 to respond to the initial ranging requests over multiple upstream channels. A hierarchical candidate list can be created with the randomized ambiguity list by moving any UCIDs that were stored as the last operational transmit channels to the head of the list while maintaining the previous randomization. Additionally, specific UCIDs sent in configuration files, a RNG-RSP message, or DCC-REQ message are added to the hierarchical candidate list. It should also be noted that while randomization is required by the DOCSIS 3.0 specification, the randomization of the upstream ambiguity list is not required for operation.

The CPE device 125*a-d* can then collect any upstream channel descriptor (UCD) messages originating from the CMTS 110 for a period of time (e.g., a collection period). The UCD message(s) can include identification of upstream channel identifiers (UCIDs) in use by the CMTS. The CPE device 125*a-d* can extract the UCIDs from the UCD message(s).

The CPE device 125*a-d* can sort the randomized upstream ambiguity list to provide preference to those upstream channels on the upstream ambiguity list which are visible to the CPE device 125*a-d*. Thus, those channels that were present in a UCD message received from the CMTS and were also present on the upstream ambiguity list are moved to the front of the ambiguity list. In some implementations, sorting the randomized upstream ambiguity list includes eliminating from the randomized upstream ambiguity list any channels in the upstream ambiguity list that were not present in any UCD message received from the CMTS. The randomized upstream ambiguity list can additionally (or alternatively) be sorted by channel type as defined in the MULPI specification at 10.2.3.6. In some implementations, UCIDs on the upstream ambiguity list which are not visible to the CPE device 125*a-d* can be removed from the sorted randomized upstream ambiguity list.

The CPE device 125*a-d* can then sort the remaining visible upstream channels by channel type. The remaining visible upstream channels are those that were identified from the UCD but not present on the upstream ambiguity list. Sorting these channels according to channel type can be done according to the DOCSIS 2.0 channel type sorting process. Thus, CPE devices 125*a-d* can attempt initial ranging on larger channels with preference over performing initial ranging on smaller channels. Other sort mechanisms can be used.

The CPE device 125*a-d* can look for the first UCID in a candidate list in received UCD messages, in accordance with the DOCSIS 3.0 specification. The candidate list can include a hierarchy of UCIDs to be used. The hierarchy can start with any override UCIDs received (e.g., through a RNG-RSP, configuration file, DCC-REQ, etc.). The second priority in the hierarchy can use any previous UCID stored in non-volatile memory, if the UCID is on the upstream ambiguity list. A third priority can use the randomized (then sorted) upstream ambiguity list. A further priority can include the remaining sorted visible upstream UCIDs collected during the UCD message collection stage. Once the first UCID from the hierarchical candidate list is identified in a received UCD message, the CPE device 125 can attempt initial ranging using the received UCID. If initial ranging is unsuccessful (e.g., after a number of ranging requests (RNG-REQ) are sent to the CMTS 110), the CPE device 125*a-d* can wait for the next UCID on the list to be observed in a UCD message, and attempt initial ranging on that upstream channel. The CPE device 125*a-d* can continue to cycle through UCIDs on the hierarchical candidate list until initial ranging is successful on an upstream channel.

Figure 2:
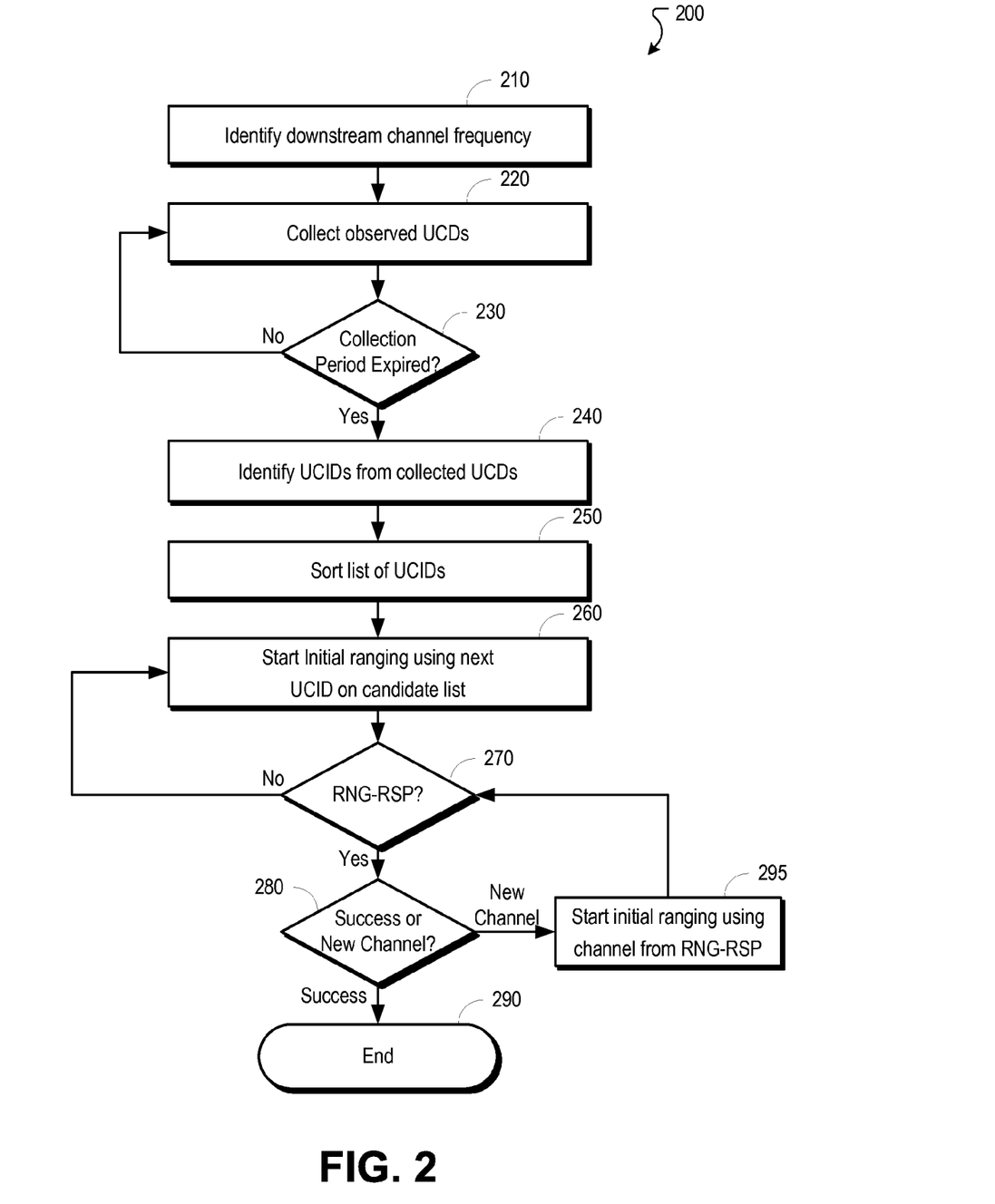
FIG. 2 is a flowchart illustrating an example process for upstream ranging using a DOCSIS 2.0 standard.

FIG. 2 is a flowchart illustrating an example process 200 for upstream ranging using a DOCSIS 2.0 standard. The process 200 can begin at stage 210, where the downstream channel frequency in use by the headend is identified. The downstream channel frequency can be identified, for example, by a scan and lock module. In some implementations, the scan and lock module can scan frequencies included in the standard for a channel that is in use, and can lock the cable modem to the identified channel. In some implementations, locking to an identified channel can include storing the channel in memory and setting the receiver to receive signals on a frequencies associated with the channel.

At stage 220, all observed UCDs are collected. The UCDs typically identify the upstream channels in use by the headend CMTS. As shown by stage 230, the UCDs are collected for a period of time (e.g., a collection period) before moving on to stage 240.

At the expiration of the collection period, UCIDs from the collected UCD messages are identified at stage 240. In some implementations, the UCIDs are extracted from the UCDs and compiled into an observed UCID list. At stage 250, the observed UCID list is sorted. In some implementations, the list can be sorted based upon channel type. DOCSIS 2.0 defines a hierarchy for sorting the list of UCIDs. In some examples, larger channels (e.g., channels with more bandwidth or a high bit-rate) can be prioritized over smaller channels. Sorting the observed UCIDs can provide a candidate upstream channel list.

At stage 260, initial ranging is started with the next channel on the candidate upstream channel list. In the first instance, the "next channel" will be a first channel on the candidate upstream channel list. Initial ranging is started by sending a RNG-REQ message to a CMTS. The RNG-REQ message indicates to the CMTS that the CPE device is performing initial ranging. After sending the RNG-REQ message, the CPE device waits for a response (RNG-RSP). If no RNG-RSP is received (e.g., over multiple RNG-REQ messages) the process 200 can return to stage 260 to start initial ranging using the next UCID on the candidate upstream channel list.

However, if a RNG-RSP is received, it is determined whether the RNG-RSP is indicating a success for the initial ranging, or telling the device to use a different channel to perform the initial ranging. If the RNG-RSP indicates a success, the process 200 ends at stage 290. If it is determined that the RNG-RSP identifies a different upstream channel to perform ranging on, then initial ranging can be performed on the identified channel as shown at stage 295. The process 200 then returns to stage 270 to wait for a RNG-RSP message.

Figure 3:
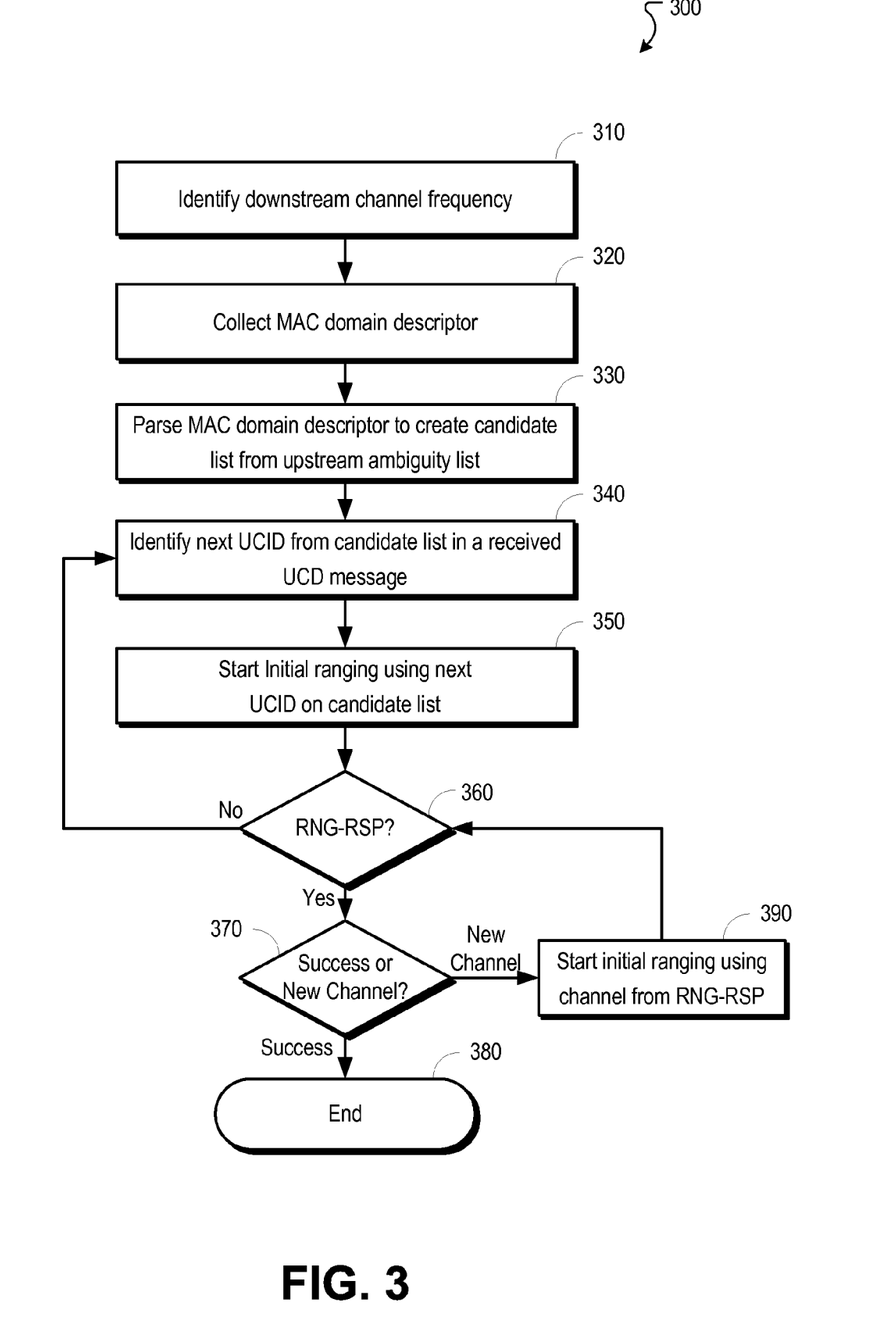
FIG. 3 is a flowchart illustrating an example process for upstream ranging using a DOCSIS 3.0 standard.

FIG. 3 is a flowchart illustrating an example process 300 for upstream ranging using a DOCSIS 3.0 standard. The process 300 can begin at stage 310, where the downstream channel frequency in use by the headend is identified. The downstream channel frequency can be identified, for example, in the same way as described above with respect to FIG. 2.

At stage 320, an MDD message is collected. The MDD message can include an upstream ambiguity list. The upstream ambiguity list, in some examples, can identify those upstream channels which the CMTS can use to help differentiate between nodes on a network. The upstream ambiguity list typically includes those UCIDs which are provided preference by the CPE device in attempting to perform initial ranging with the CMTS.

At stage 330, the MDD message is parsed to identify the upstream channel ambiguity list. The upstream channel ambiguity list can be used to identify a candidate upstream channel list for use by a CPE device in initial ranging. The candidate upstream channel list is created first by randomizing the UCIDs included in the upstream ambiguity list according to the DOCSIS 3.0 specification. Second, any UCIDs that were stored as the last operational transmit channels are moved to the head of the list while maintaining the previous randomization. Then, any specific UCIDs sent, for example, in configuration files, in a RNG-RSP message, in a DCC-REQ message, etc. are added to the candidate list.

At stage 340, a specific UCID from the upstream candidate list is identified in a received UCD message. The existence of the specific UCID from the upstream ambiguity list indicates that the upstream channel identified by the UCID on the upstream ambiguity list is in use by the CMTS. The specific UCID is identified as the next UCID on the candidate list. Thus, in a first iteration, the next UCID would be the first UCID on the candidate list, and in a second iteration, the next UCID would be the second UCID on the candidate list, etc.

Upon identifying the specific UCID in a received UCD message, at stage 350 initial ranging is started using the identified UCID on the candidate list. Initial ranging is started by sending a RNG-REQ message to a CMTS. The RNG-REQ message indicates to the CMTS that the CPE device is performing initial ranging. After sending the RNG-REQ message, the CPE device waits for a response (RNG-RSP) at stage 360. If no RNG-RSP is received (e.g., over multiple RNG-REQ messages) the process 300 can return to stage 340 to start initial ranging using the next UCID on the candidate upstream channel list.

If a RNG-RSP is received, at stage 370 it is determined whether the RNG-RSP indicates a successful initial ranging, or whether the CMTS has instructed the device to range on a different channel. If the RNG-RSP indicates that the initial ranging was a success, the process 300 ends at stage 380. However, if the RNG-RSP indicates that the device should perform initial ranging on another channel, the device performs initial ranging on the channel indicated by the RNG-RSP message at stage 390. The device then waits for a RNG-RSP message at stage 360.

Upon successful completion of initial ranging, a communications device can continue to perform subsequent stages of ranging and registration as described within the MULPI specification. Thus, it should be understood that the end (stage 360) of process 300 the beginning of subsequent ranging stages.

Figure 4:
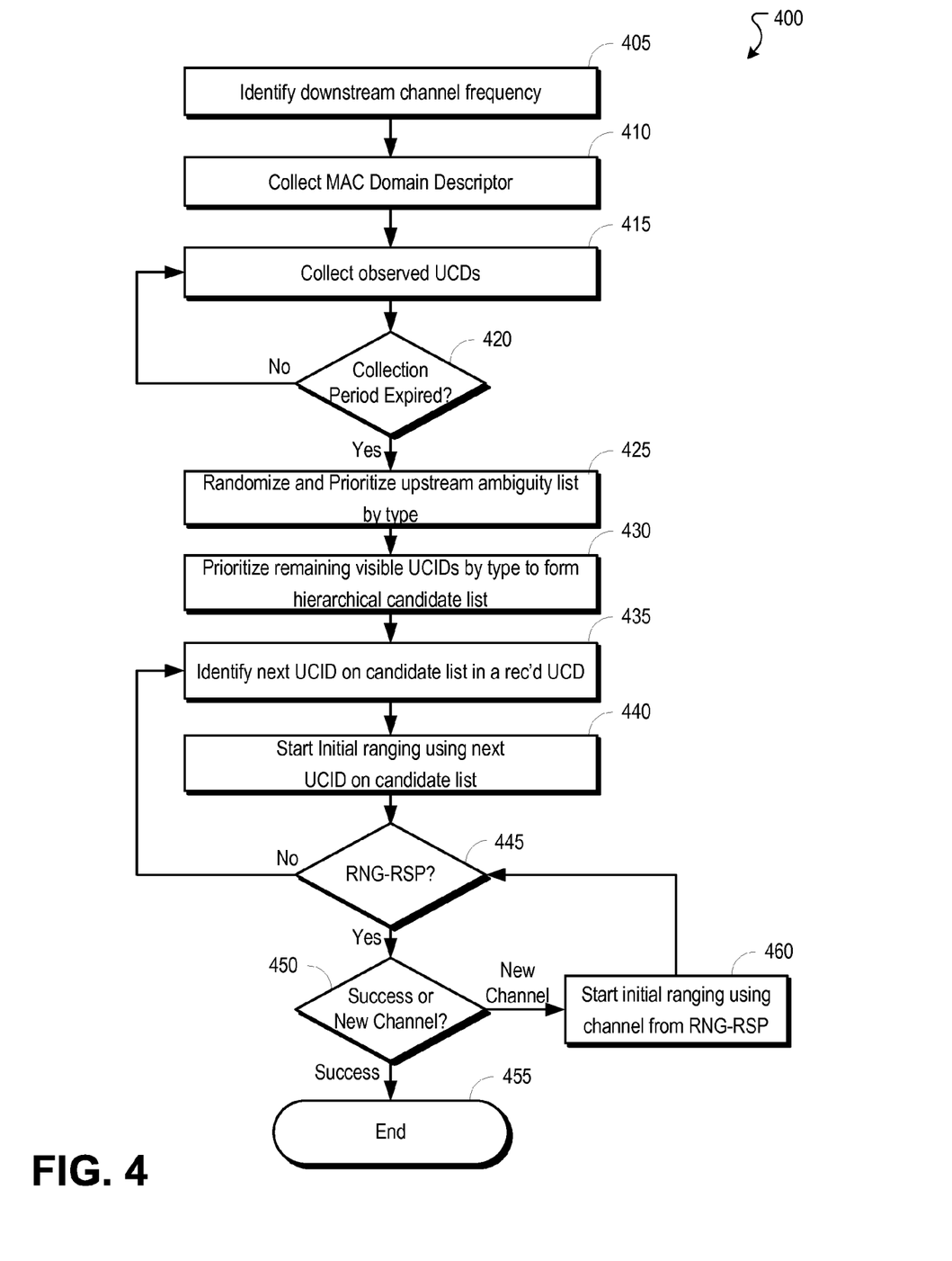
FIG. 4 is a flowchart illustrating an example process for improved upstream ranging on communications devices.

FIG. 4 is a flowchart illustrating an example process 400 for improved upstream ranging on communications devices. The process 400 can begin at stage 405, where the downstream channel frequency in use by the headend is identified. The downstream channel frequency can be identified, for example, in the same way as described above with respect to FIG. 2.

At stage 410, an MDD message is collected. The MDD message can include an upstream ambiguity list. The upstream ambiguity list, in some examples, can identify those upstream channels which the CMTS can use to help differentiate between nodes on a network. The upstream ambiguity list typically includes those UCIDs which are provided preference by the CPE device in attempting to perform initial ranging with the CMTS. In some implementations, the UCIDs included on the upstream ambiguity list can be randomized to minimize the possibility that every device on the system attempts initial ranging on the same upstream channel.

At stage 415, observed UCDs are collected. The UCDs typically include one or more UCIDs identifying the upstream channels in use by the headend CMTS. As shown by stage 420, the UCDs are collected for a period of time (e.g., a collection period) before moving on to stage 425.

At stage 425, the upstream ambiguity list is randomized and prioritized. In some implementations, the upstream ambiguity list is randomized to provide a load balancing functionality. The randomized upstream ambiguity list can be prioritized, in some implementations, based upon the visibility of the UCIDs included in the list. Thus, UCIDs present in the UCD message(s) collected by the CPE device are moved ahead of those UCIDs which were not observed in the UCD message(s). In some implementations, sorting the randomized upstream ambiguity list includes eliminating from the randomized upstream ambiguity list any channels in the upstream ambiguity list that were not present in any UCD message received from the CMTS. In additional implementations, the upstream ambiguity list can additionally (or alternatively) be sorted based upon channel type. For example, the upstream ambiguity list can be sorted as described in the MULPI specification at section 10.2.3.6.

At stage 430, the remaining visible UCIDs are prioritized by type to form a hierarchical candidate list. The remaining visible UCIDs can be prioritized by type based upon a MULPI specification. The remaining visible UCIDs include those UCIDs which were observed, but not included in the upstream ambiguity list. In some implementations, the hierarchical candidate list can include override UCIDs in a first priority, UCIDs stored in non-volatile memory in a second priority, UCIDs from the randomized and sorted upstream ambiguity list in a third priority and the remaining sorted visible UCIDs in a fourth priority.

At stage 435, a next UCID on the candidate list is identified within a received UCD. In some implementations, a CPE device can wait for the UCID to appear in a UCD message before beginning initial ranging. Identification of the next UCID on the candidate list can ensure that a device does not begin initial ranging on an upstream channel that is not in use on the network.

At stage 440, initial ranging is started using the identified UCID from the received UCD message. Initial ranging is started by sending a RNG-REQ message to a CMTS. The RNG-REQ message indicates to the CMTS that the CPE device is performing initial ranging. After sending the RNG-REQ message, the CPE device waits for a response (RNG-RSP) at stage 445. If no RNG-RSP is received (e.g., over multiple RNG-REQ messages) the process 400 can return to stage 435 to start initial ranging using the next UCID on the candidate upstream channel list.

If a RNG-RSP is received, at stage 450 it is determined whether the RNG-RSP indicates a successful initial ranging, or whether the CMTS has instructed the device to range on a different channel. If the RNG-RSP indicates that the initial ranging was a success, the process 400 ends at stage 455. However, if the RNG-RSP indicates that the device should perform initial ranging on another channel, the device performs initial ranging on the channel indicated by the RNG-RSP message at stage 460. The device then waits for a RNG-RSP message at stage 445. If a RNG-RSP message is received, and the RNG-RSP message indicates a success, the process 400 ends at stage 455. If no RNG-RSP is received, the process can return to cycling through the candidate list at stage 435. If a RNG-RSP is received and indicates a different channel, the process 400 can start initial ranging using the channel identified by the RNG-RSP.

Upon successful completion of initial ranging, a communications device can continue to perform subsequent stages of ranging and registration as described within the MULPI specification. Thus, it should be understood that the end (stage 455) of process 300 the beginning of subsequent ranging stages.

Figure 5:
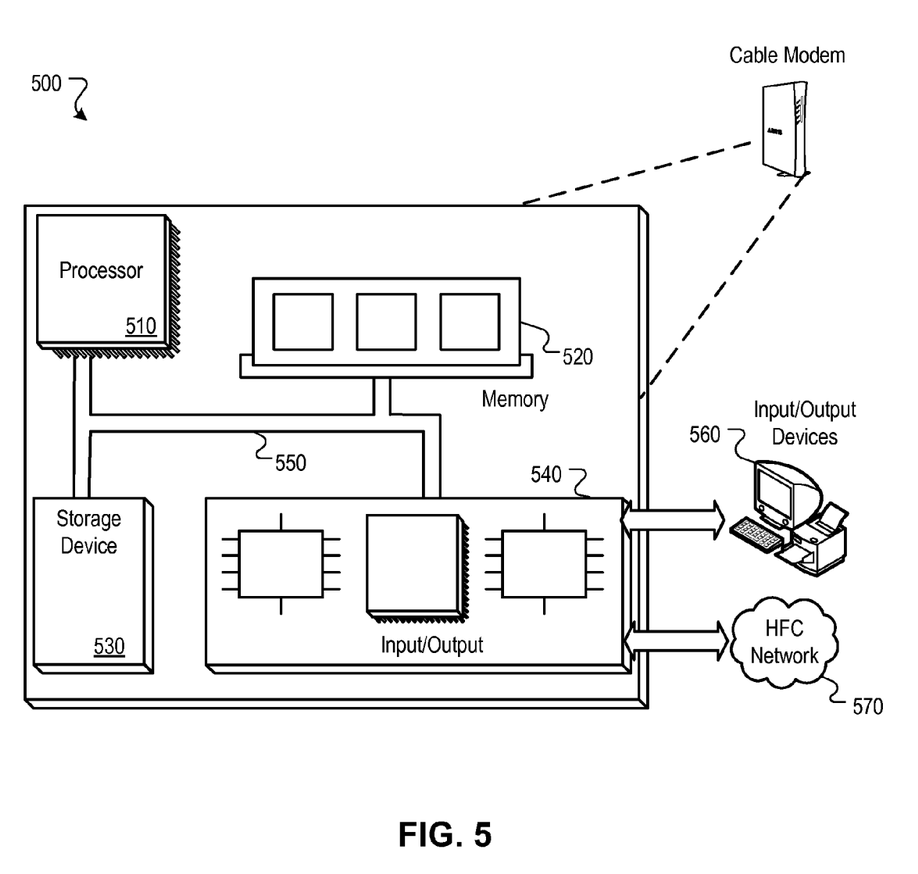
FIG. 5 is a block diagram illustrating a cable modem operable to include improved upstream ranging.

FIG. 5 is a block diagram illustrating a cable modem operable to include improved upstream ranging. However, it should be understood that many different kinds of network devices (e.g., including set top boxes, media terminal adapters, etc.) can implement improved upstream ranging in accordance with this disclosure. The cable modem 500 can include a processor 510, a memory 520, a storage device 530, and an input/output device 540. Each of the components 510, 520, 530, and 540 can, for example, be interconnected using a system bus 550. The processor 510 is capable of processing instructions for execution within the cable modem 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the cable modem 500. In one implementation, the memory 520 is a computer-readable medium. In some implementations, the memory 520 can include a volatile memory unit. In some implementation, the memory 520 can include a non-volatile memory unit.

In some implementations, the storage device 530 is capable of providing mass storage for the cable modem 500. In one implementation, the storage device 530 is a computer-readable medium. In various different implementations, the storage device 530 can, for example, include a hard disk device, an optical disk device, flash memory or some other large capacity storage device.

The input/output device 540 provides input/output operations for the cable modem 500. In one implementation, the input/output device 540 can include one or more of a plain old telephone interface (e.g., an RJ11 connector), a network interface device, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, such as one or more computer 560, as well as sending communications to, and receiving communications from a network 570. Other implementations, however, can also be used, such as mobile computing devices, mobile communication devices, set-top box television client devices, etc.

The communications device (e.g., cable modem, set top box, media terminal adapter, etc.) of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A computer-implemented method, comprising:
   identifying a downstream channel at a customer premise equipment device;
   receiving a list of upstream channels from a headend system on said downstream channel identified by the customer premise equipment device;
   randomizing said list of upstream channels at the customer premise equipment device;
   sorting the randomized list of upstream channels at the customer premise equipment device;
   creating a hierarchical candidate list at the customer premise equipment device based on said sorted list of upstream channels and one or more predefined channels comprising upstream channels not included in the list of upstream channels received from the headend system; and
   performing ranging on upstream channels at the customer premise equipment device in an order defined by the hierarchical candidate list until successfully ranging on one of the upstream channels.

2. The computer-implemented method of claim 1, wherein the sorting of said list of upstream channels is based on channel size.

3. The computer-implemented method of claim 1, wherein ranging is performed on an upstream communication path based on asynchronous time division multiplexing.

4. The computer-implemented method of claim 3, wherein receiving the list of upstream channels on said downstream channel is provided by a MAC domain descriptor in a DOCSIS based communication system.

5. The computer-implementation method of claim 1, further comprising:
   receiving one or more upstream channel descriptors over a collection period on said downstream channel;
   removing upstream channels from said hierarchical candidate list if said upstream channels are not observed over said collection period; and
   appending any remaining observed upstream channels, if existing, at the end of said hierarchical list, prior to attempting ranging.

6. The computer-implemented method of claim 5, further comprising sorting the remaining observed upstream channels is performed prior to appending to said hierarchical list.

7. The computer-implemented method of claim 6, wherein the sorting of the remaining observed upstream channels is based on channel size.

8. The computer-implementation method of claim 1, further comprising:
   receiving one or more upstream channel descriptors over a collection period on said downstream channel;
   moving ahead upstream channels within said hierarchical candidate list if said upstream channels are observed over said collection period; and
   appending any remaining observed upstream channels not on the hierarchical candidate list, if existing, at the end of said hierarchical candidate list, prior to attempting ranging.

9. The computer-implemented method of claim 8, further comprising sorting the remaining observed upstream channels prior to appending to said hierarchical list.

10. The computer-implemented method of claim 9, wherein the sorting of the remaining upstream channels is based on channel size.

11. The computer-implementation method of claim 1, further comprising:
    receiving one or more upstream channel descriptors over a collection period on said downstream channel; and
    appending said one or more observed upstream channels at the end of the said hierarchical list if they are not part of said hierarchical list, prior to attempting ranging.

12. The computer-implemented method of claim 11, further comprising sorting the one or more observed upstream channels prior to appending to said hierarchical list.

13. The computer-implemented method of claim 12, wherein the sorting of said one or more observed upstream channels is based on channel size.

14. One or more non-transitory computer-readable media having instructions stored thereon, the one or more computer readable media, when executed by a processor, cause the processor to perform operations comprising:
    identifying a downstream channel;
    receiving a list of upstream channels on said downstream channel;
    randomizing said list of upstream channels;

sorting the randomized list of upstream channels based on channel size;

creating a hierarchical candidate list by appending said sorted list of upstream channels after one or more predefined channels comprising both channels not included on the received list of upstream channels and channels included on the received list of upstream channels; and performing ranging on the upstream channels in an order defined by the hierarchical candidate list until successfully ranging on one of the upstream channels.

15. The one or more computer-readable media of claim 14, wherein receiving the list of upstream channels on said downstream channel comprises receiving a MAC domain descriptor in a DOCSIS based communication system and parsing the MAC domain descriptor.

16. The one or more computer-readable media of claim 14, further comprising:

receiving one or more upstream channel descriptors over a collection period on said downstream channel;

removing upstream channels from said hierarchical candidate list if said upstream channels are not observed over said collection period;

sorting the remaining observed upstream channels, if existing, based on channel size; and appending any remaining observed upstream channels at the end of said hierarchical list, prior to attempting ranging.

17. The one or more computer-readable media of claim 14, further comprising:

receiving one or more upstream channel descriptors over a collection period on said downstream channel; and moving ahead any upstream channels within said hierarchical candidate list if said upstream channels are observed over said collection period;

sorting any remaining observed upstream channels based on channel size; and appending any sorted remaining observed upstream channels at the end of said hierarchical list, prior to attempting ranging.

18. The one or more computer-readable media of claim 14, further comprising:

receiving one or more upstream channel descriptors over a collection period on said downstream channel;

sorting any the upstream channel frequencies observed in the upstream channel descriptors and not included in the hierarchical candidate list based on channel size; and appending the sorted observed upstream channels at the end of the said hierarchical list prior to attempting ranging.

19. A system, comprising:

input/output circuitry and a processor operable to identify a downstream channel and receive a list of upstream channels on said downstream channel;

a data store operable to store computer program instructions and temporary storage for said processor;

a processor operable execute said computer program instructions, the computer program instructions being operable to cause the processor to:

randomize said list of upstream channels;

sort said randomized list of upstream channels;

generate a hierarchical candidate list by appending said sorted list of upstream channels after one or more predefined channels comprising channels not included on said list of upstream channels; and perform ranging on the upstream channels in conjunction with the input/output circuitry, the ranging being performed in an order defined by the hierarchical candidate list until successfully ranging on one of the upstream channels.

20. The system of claim 19, wherein said computer program instructions are further operable to cause the processor to sort said list of upstream channels based on channel size.

21. The system of claim 19, wherein the computer program instructions are further operable to cause the processor to perform ranging on an upstream communication path in conjunction with the input/output circuitry based on asynchronous time division multiplexing.

22. The system of claim 21, wherein the list of upstream channels received on said downstream channel is received via a MAC domain descriptor in a DOCSIS based communication system.

23. The system of claim 19, wherein the computer program instructions are further operable to cause the processor to:

receive one or more upstream channel descriptors over a collection period on said downstream channel via the input/output circuitry; and remove upstream channels from said hierarchical candidate list if said upstream channels are not observed over said collection period;

sort any remaining observed channels based on channel size; and append any sorted remaining channels at the end of said hierarchical list prior to attempting ranging.

24. The system of claim 19, wherein the computer program instructions are further operable to cause the processor to:

receive one or more upstream channel descriptors over a collection period on said downstream channel via the input/output circuitry; and move ahead upstream channels received in said list of upstream channels from said hierarchical candidate list if said upstream channels are observed in the one or more upstream channel descriptors over said collection period;

sort any remaining observed channels based on channel size; and append any remaining observed channels at the end of said hierarchical list, prior to attempting ranging.

25. The system of claim 19, wherein the computer program instructions are further operable to cause the processor to:

receive one or more upstream channel descriptors over a collection period on said downstream channel via the input/output circuitry; and sort one or more upstream channels observed from the one or more upstream channel descriptors based on channel size; and append the sorted upstream channels observed from the one or more upstream channel descriptors at the end of the said hierarchical list if they are not part of said hierarchical list prior to attempting ranging.

* * * * *